US011558428B2

(12) United States Patent
Mizrahi

(10) Patent No.: US 11,558,428 B2
(45) Date of Patent: Jan. 17, 2023

(54) AUTOMOTIVE GATEWAY PROVIDING SECURE OPEN PLATFORM FOR GUEST APPLICATIONS

(71) Applicant: Marvell Asia Pte, Ltd., Singapore (SG)

(72) Inventor: Noam Mizrahi, Modi'in (IL)

(73) Assignee: MARVELL ASIA PTE LTD, Singapore (SG)

( * ) Notice: Subject to any disclaimer, the term of this patent is extended or adjusted under 35 U.S.C. 154(b) by 147 days.

(21) Appl. No.: 17/095,785

(22) Filed: Nov. 12, 2020

(65) Prior Publication Data

US 2021/0152605 A1 May 20, 2021

Related U.S. Application Data

(60) Provisional application No. 62/936,232, filed on Nov. 15, 2019.

(51) Int. Cl.
*H04L 9/40* (2022.01)
*B60R 16/023* (2006.01)
*B60R 25/30* (2013.01)
*G06F 9/455* (2018.01)
*H04L 12/66* (2006.01)
*H04L 67/12* (2022.01)

(52) U.S. Cl.
CPC .......... *H04L 63/20* (2013.01); *B60R 16/0231* (2013.01); *B60R 25/30* (2013.01); *G06F 9/45545* (2013.01); *G06F 9/45558* (2013.01); *H04L 12/66* (2013.01); *H04L 63/08* (2013.01); *H04L 63/10* (2013.01); *H04L 63/145* (2013.01); *H04L 67/12* (2013.01); *G06F 2009/45587* (2013.01)

(58) Field of Classification Search
CPC ......... H04L 63/20; H04L 12/66; H04L 63/08; H04L 63/10; H04L 63/145; H04L 67/12; H04L 63/02; H04L 67/125; H04L 67/562; B60R 16/0231; B60R 25/30; G06F 9/45545; G06F 9/45558; G06F 2009/45587
See application file for complete search history.

(56) References Cited

U.S. PATENT DOCUMENTS 9,588,877 B1 * 3/2017 Adir .................... G06F 11/3684
10,939,262 B2 * 3/2021 Mosenia ................. H04W 4/48
2009/0045910 A1 * 2/2009 Zoller .................. B60W 50/06
340/5.8

(Continued)

FOREIGN PATENT DOCUMENTS

WO WO-2009080015 A2 * 7/2009 ............ B60W 50/06

OTHER PUBLICATIONS

Chang, Teng-Wen; "Android/OSGi-based Vehicular Network Management System", Feb. 2010, IEEE, pp. 1644-1649 (Year: 2010).*

(Continued)

*Primary Examiner* — Matthew Smithers

(57) ABSTRACT

An automotive gateway includes one or more interfaces and one or more processors. The one or more interfaces are configured to communicate with electronic subsystems of a vehicle. The one or more processors and configured to host one or more guest applications and to control communication traffic between the one or more guest applications and the electronic subsystems of the vehicle in accordance with a security policy.

20 Claims, 3 Drawing Sheets

(56) References Cited

U.S. PATENT DOCUMENTS

| | | | | |
|---|---|---|---|---|
| 2013/0212659 | A1* | 8/2013 | Maher | G05D 1/0022 |
| | | | | 726/6 |
| 2017/0134788 | A1* | 5/2017 | Lee | G06F 9/45558 |
| 2017/0295188 | A1 | 10/2017 | David et al. | |
| 2019/0258251 | A1* | 8/2019 | Ditty | G06V 20/58 |
| 2020/0218487 | A1* | 7/2020 | Rush | B60K 35/00 |

OTHER PUBLICATIONS

Mosenia et al.; "ProCMotive: Bringing Programmability and Connectivity into Isolated Vehicles", Mar. 2018, Proceedings of the ACM on Interactive, Mobile, Wearable and Ubiquitous Technologies, vol. 2, No. 1, Article 26, pp. 1-31. (Year: 2018).*

IEEE Std 802.3ch™—2020, "IEEE Standard for Ethernet, Amendment 8: Physical Layer Specifications and Management Parameters for 2.5 Gb/s, 5 Gb/s, and 10 Gb/s Automotive Electrical Ethernet", pp. 1-207, Jun. 4, 2020.

IEEE Std 802.3bw™—2015, "IEEE Standard for Ethernet, Amendment 1: Physical Layer Specifications and Management Parameters for 100 Mb/s Operation over a Single Balanced Twisted Pair Cable (100BASE-T1)", pp. 1-88, Oct. 26, 2015.

IEEE Std 802.3cg™—2019, "IEEE Standard for Ethernet, Amendment 5: Physical Layers Specifications and Management Parameters for 10 Mb/s Operation and Associated Power Delivery over a Single Balanced Pair of Conductors", pp. 1-256, Nov. 7, 2019.

International Application # PCT/IB2020/060650 Search Report dated Jan. 19, 2021.

Takatsuka, "Gap analysis of vehicle gateway", ITU-T Paper SG16-C.86, pp. 1-5, Jan. 3, 2017.

Rollet et al., "G.V2A: Editorial modifications and addition of service data flows in figures", ITU-T Paper 1703-REN-C04, pp. 1-18, Mar. 6, 2017.

Bouard et al., "Practical information-flow aware middleware for in-car communication", CyCAR'13, Berlin, Germany, pp. 1-6, Nov. 4, 2013.

Karthik et al., "Hypervisor based approach for integrated cockpit solutions", IEEE 8th International Conference on Consumer Electronics, Berlin, Germany, pp. 1-7, Sep. 18, 2018.

\* cited by examiner

AUTOMOTIVE GATEWAY PROVIDING SECURE OPEN PLATFORM FOR GUEST APPLICATIONS

CROSS-REFERENCE TO RELATED APPLICATIONS

This application claims the benefit of U.S. Provisional Patent Application 62/936,232, filed Nov. 15, 2019, whose disclosure is incorporated herein by reference.

FIELD OF THE DISCLOSURE

The present disclosure relates generally to automotive networks, and particularly to secure gateways in automotive networks.

BACKGROUND

Modern vehicles, and in particular autonomous vehicles, comprise a wide variety of sensors and electronic systems. Some of these components, for example Electronic Control Units (ECUs) that control the vehicle steering and breaks, have a strong impact, on driver safety. Other components, e.g., the vehicle's infotainment system, have a lesser impact, on safety.

The description above is presented as a general overview of related art in this field and should not be construed as an admission that any of the information it contains constitutes prior art against the present patent application.

SUMMARY

An embodiment that is described herein provides an automotive gateway including one or more interfaces and one or more processors. The one or more interfaces are configured to communicate with electronic subsystems of a vehicle. The one or more processors and configured to host one or more guest applications and to control communication traffic between the one or more guest applications and the electronic subsystems of the vehicle in accordance with a security policy.

In an embodiment, in accordance with the security policy, the one or more processors are configured to selectively grant or deny transfer of data from an electronic subsystem of the vehicle to a guest application. In another embodiment, in accordance with the security policy, the one or more processors are configured to selectively grant or deny a request from a guest application to control an electronic subsystem of the vehicle. In an example embodiment, the one or more processors are configured to deny the request when the request, or the electronic subsystem, has an impact on vehicle safety.

In a disclosed embodiment, the guest, applications include Virtual Machines (VMs), and the one or more processors are configured to run a hype visor that controls the communication, traffic of the VMs in accordance with the security policy. In another embodiment, the one or more processors are configured to expose to the guest applications an Application Programming Interface (API) that complies with the security policy.

In an embodiment, in accordance with the security policy, the one or more processors are configured to authenticate data downloaded from outside the vehicle. In another embodiment, in accordance with the security policy, the one or more processors are configured to permit data flow from electronic subsystem of the vehicle to a guest application, and to prevent data flow from the guest application to the electronic subsystem. In yet another embodiment, in accordance with the security policy, the one or more processors are configured to protect the electronic subsystems from ransomware. In still another embodiment, in accordance with the security policy, the one or more processors are configured to prevent data sharing between at least first and second guest applications among the guest applications.

There is additionally provided, in accordance with an embodiment that is described herein, a method for data processing in a vehicle. The method includes hosting one or more guest applications in an automotive gateway installed in a vehicle, and controlling, by the automotive gateway, communication traffic between the one or more guest applications and electronic subsystems of the vehicle in accordance with a security policy.

The present disclosure will be more fully understood from the following detailed description of the embodiments thereof, taken together with the drawings in which:

DETAILED DESCRIPTION OF EMBODIMENTS

Figure 1:
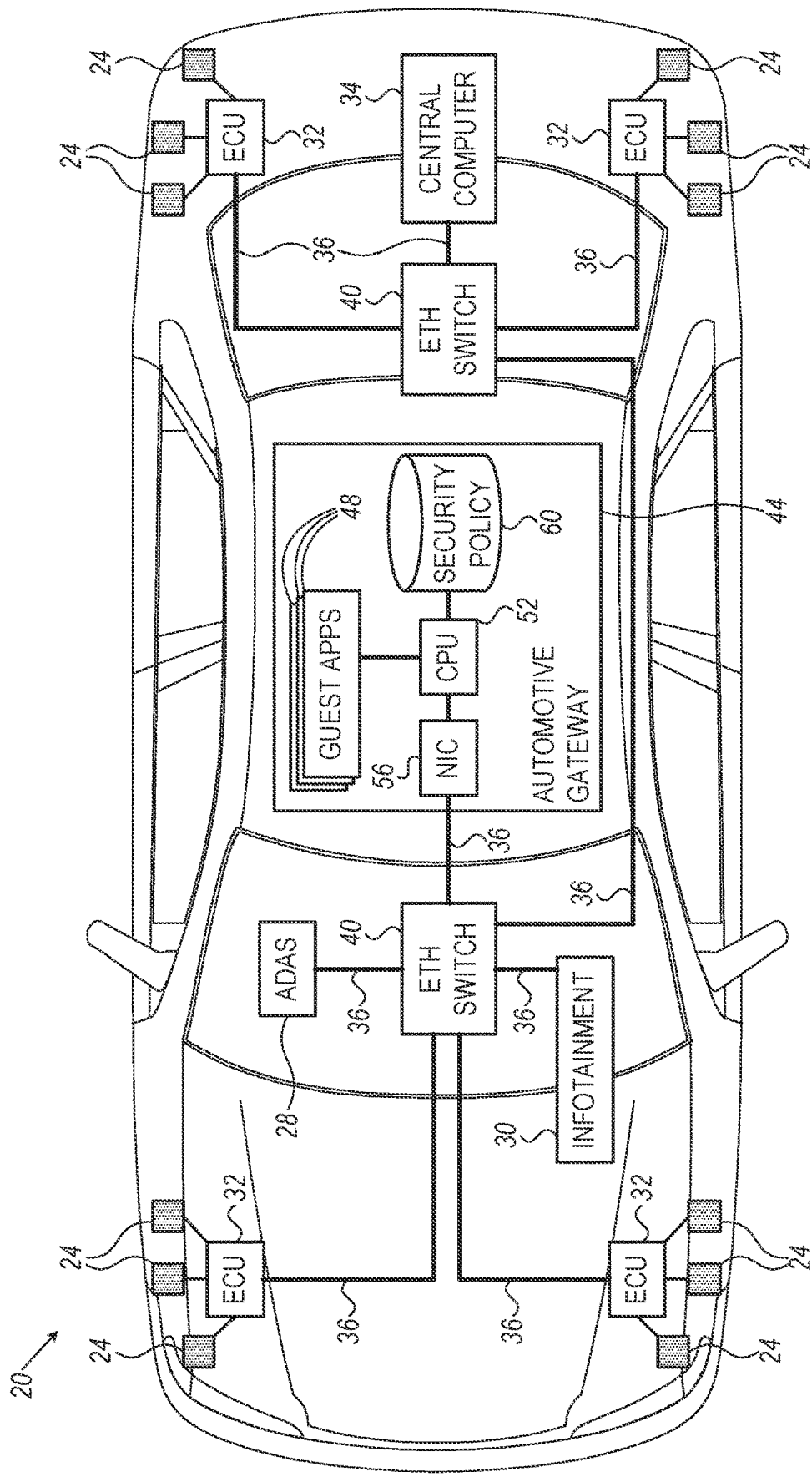
FIG. 1 is a block diagram that schematically illustrates an automotive data-processing system comprising a secure gateway, in accordance with an embodiment that is described herein.

Embodiments that are described herein provide methods and systems that enable running guest applications in an automotive data-processing system of a vehicle in a controlled, safe and secure manner. In the present context, the term "guest application" (also referred to herein as "app" for brevity) includes any type of software program that runs in the vehicle's data-processing system.

Some guest applications may provide system functions. Other guest applications may be provided by the vehicle manufacturer, e.g., installed before delivery of the vehicle. Examples of such applications comprise navigation apps, radio apps, apps that track and display fuel consumption, and the like. Another example of a manufacturer-provided guest application is a "personalization" app, which identifies the driver and adapts certain vehicle properties (e.g., chair position, infotainment preferences, etc.) to his/her preferences.

Yet other guest applications may be provided, by third parties, e.g., downloaded and installed by the vehicle owner. An example of such an app may comprise, for example, a "bird's eye view" app that processes the video produced by the vehicle cameras and displays a synthetic, external view of the vehicle and its surrounding, as if imaged by a drone. Such a view may be displayed to the driver and/or used for any suitable virtual-reality application.

Guest applications typically interact with, the vehicle's sensors and/or electronic systems. Some forms of interaction merely amount to the use of data generated by sensors. Other forms of interaction are more intrusive, e.g., involve some control over the vehicle systems. Depending on the form and extent of interaction with the vehicle systems, guest applications may expose the vehicle and the driver to safety hazards, security threats and other undesired events. For example, a guest app that interferes with the vehicle's breaks, engine or steering can have a strong impact on driver safety.

On the other hand, an open interface for installing and running guest applications is a highly desirable feature, which greatly enriches the vehicle owner's user experience. For example, given such an open interface, a car manufacturer may launch an "app store" from which vehicle owners can download quest applications to their cars.

Embodiments that are described herein provide such an open interface, without compromising safety and security, using an automotive gateway that monitors and controls the interaction of guest applications with the electronic subsystems of the vehicle. In the present context, the term "electronic subsystem" refers to both sensors (e.g., cameras, radars, lidars, environmental sensors, etc.) and electronic systems (e.g., Electronics Control Units (ECUs), Advanced Driver-Assistance Systems (ADAS 28, infotainment systems, telematics systems, etc.).

Typically, the various electronic subsystems of the vehicle are connected to a packet network, e.g., an Ethernet network. Some subsystems may connect directly to the network. Other subsystems, e.g., sensors, may connect to the network via an electronic system such as an ECU. In addition, in some implementations the vehicle's data-processing system comprises a central secure automotive gateway (also referred to herein simply as "gateway" for brevity) connected to the network. The gateway configured to host one or more guest applications, and to control the communication traffic between the guest applications and the electronic subsystems of the vehicle in accordance with a defined security policy.

The gateway comprises one or more processors, e.g., a cluster of multiple Central Processing Units (CPUs) interconnected by a, suitable fabric, which are configured to perform the various processing tasks of the gateway. The guest apps may be implemented and hosted as Virtual Machines (VMs), containers, operating-system processes, or in any other suitable form.

In some embodiments, the guest applications are implemented as VMs. The gateway further runs a virtualization software layer, referred to as a hypervisor, which allocates resources (e.g., processing, memory, storage and/or networking resources) to the VMs. Among other tasks, the hypervisor enforces a security policy that specifies permitted and/or forbidden, interactions between the guest applications and the subsystems of the vehicle. The hypervisor typical monitors the communication traffic between the guest applications and the subsystems of the vehicle, and controls the communication traffic in accordance with the security policy. For example, the hypervisor may grant or deny requests from guest applications to receive data from a certain subsystem, e.g., a sensor. As another example, the hypervisor may grant deny requests from guest applications to control a certain subsystem.

The security policy is typically specified by the vehicle manufacturer. With proper specification and enforcement of such a policy, the gateway is able to provide an open, flexible Application Programming Interface (API) for guest applications, and at the same time maintain a high standard of driver safety and security. Several demonstrative examples of security policies are given below.

FIG. 1 is a block diagram, that schematically illustrates an, automotive data-processing system 20, in accordance with an embodiment, that is described herein. System 20 is disposed in a vehicle, and comprises various sensors 24, multiple Electronics Control Units (ECUs) 32, an Advanced Driver-Assistance System (ABAS) 28, an infotainment system 30 and a central computer 34.

In, various embodiments, sensors 24 may comprise, for example, video cameras, velocity sensors, accelerometers, audio sensors, infra-red sensors, radar sensors, lidar sensors, ultrasonic sensors, rangefinders or other proximity sensors, or any other suitable sensor type. In the present example, each ECU 32 (sometimes referred to as a "zone ECU") is connected to the sensors installed in a respective zone of the vehicle. Each ECU 32 typically controls its respective sensors 24 and collects data from the sensors.

As noted above, the various sensors 24 and the various electronic systems (e.g., ECUs 32, ADAS 28, infotainment system 30 and central computer 34) are referred to collectively as "electronic subsystems" or "subsystems".

In some embodiments, the various electronic subsystems of system 20 communicate over a packet network installed in the vehicle. In the present example the network comprises an Ethernet network, but other suitable protocols can also be used. The network comprises multiple Ethernet links 36, and one or more Ethernet switches 40. In various embodiments, the bit rate used in the network may be 10G bits per second (10 Gbps) in accordance with IEEE 802.3ch, 100 Mbps in accordance with IEEE 802.3bw, 10 Mbps in accordance with IEEE 802.3cg (10Base-T1s), or any other suitable bit rate. Links 36 may comprise, for example, twisted-pair copper links or any other type of link suitable for Ethernet communication.

In the example of FIG. 1, system 20 further comprises an automotive gateway 44 that is configured to host one or more guest applications 48. In an embodiment, gateway 44 comprises one or more CPUs 52, e.g., a cluster of multiple CPUs interconnected by a suitable interconnection fabric. The description below refers to a single CPU, purely for the sake of clarity. Gateway 44 further comprises a Network Interface Controller (NIC) 56 for connecting to the packet network of the vehicle. NIC 56 typically connects to a port of one oF switches 40 via a link 36.

Gateway 44 additionally comprises a, suitable memory or storage device that stores a defined security policy 60. Among other tasks, CPU 52 is configured to monitor the communication traffic between guest applications 48 and the various subsystems of the vehicle, and to grant or deny interactions between guest applications 48 and vehicle subsystems depending on the policy.

Figure 2:
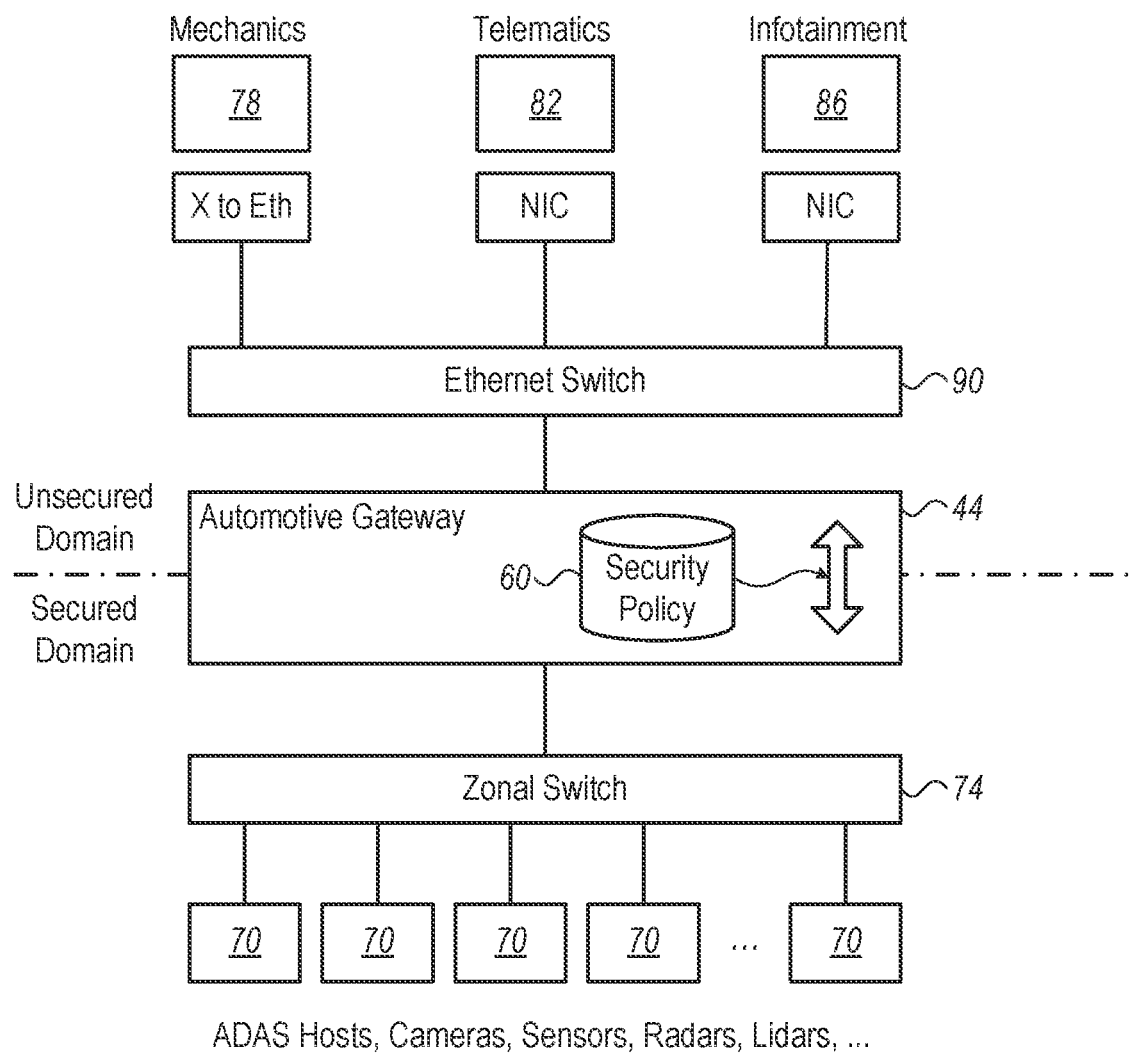
FIG. 2 is a block diagram that schematically illustrates an example configuration of the automotive data-processing system of FIG. 1, in accordance with an embodiment that is described herein.

FIG. 2 is a block diagram, that schematically illustrates an example configuration of automotive data-processing system 20 of FIG. 1, in accordance with an embodiment that is described herein. As seen, in this embodiment the system is logically partitioned into a "secured domain" and an "unsecured domain." Gateway 44 controls the communication traffic between the two domains in accordance with security policy 60.

In the present example, the secured domain comprises subsystems 70 that are considered to have a, strong impact on safety, e.g., ADAS hosts, cameras, radars, lidars and the other suitable subsystems having a strong impact on safety. In an implementation, subsystems 70 connect to gateway 44 via a zonal Ethernet switch 74. The unsecured domain comprises subsystems that are considered to have a lesser impact on safety, such as mechanics-related subsystems 78 (e.g., relating to ignition key, chairs, lights, immobilizer and others), a telematics system 82 and an infotainment system 86. Some subsystems, e.g., mechanics-related subsystems 78, may connect to the network using a converter (denoted "X to Eth" in the figure) that converts their proprietary protocols or signals into Ethernet frames. Other subsystems, e.g., telematics system 82 and infotainment system 86, may connect to the network via respective NICs. In an embodiment, the subsystems of the unsecured domain connect to gateway 44 via an Ethernet switch 90. In alternative embodiments switch 90 may be omitted.

Figure 3:
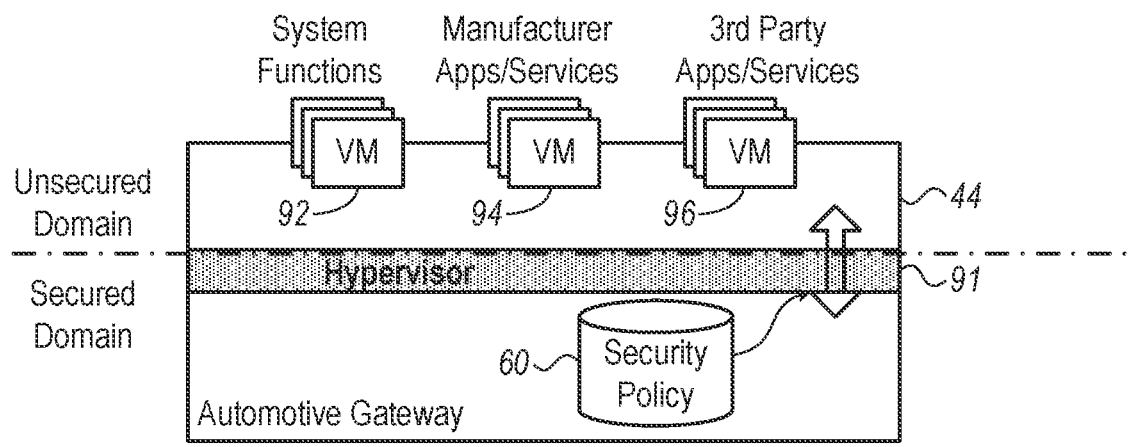
FIG. 3 is a block diagram that schematically illustrates the secure gateway of the automotive data-processing system of FIG. 1, in accordance with an embodiment that is described herein.

FIG. 3 is a block diagram that schematically illustrates an example configuration of central automotive gateway 44, in accordance with an embodiment that is described herein. In the present example, CPU 52 of gateway 44 runs a hypervisor 91 that hosts multiple VMs that run respective guest applications. The VMs comprise, for example, VMs 92 that run system-function guest apps, VMs 94 that run manufacturer-installed guest apps, and VMs 96 that run third-party guest apps. Typically, each of the VMs runs a single guest app. A VM is created by hypervisor 91 when the guest app is launched, and torn-down when the guest app is closed.

The VMs in this embodiment are regarded as belonging to the unsecured domain. Hypervisor 91, on the other hand, is considered as belonging to the secured domain. Among other tasks, hypervisor 91 controls the transfer of data between the secured and unsecured domains by controlling the transfer of communication traffic between the VMs and the vehicle subsystems (not shown in the present figure, shown in FIG. 2 above), in accordance with security policy 60. In an embodiment, hypervisor 91 controls the communication traffic only for subsystems that belong to the secured domain, and allows unconditional traffic flow for subsystems that belong to the unsecured domain.

Typically, hypervisor 91 and policy 60 are fully controlled by the vehicle manufacturer and not accessible to other parties. In some embodiments, hypervisor 91, policy 60 and/or the operating system of gateway 44 as a whole, may be updated by the car manufacturer from time to time, e.g., over a wireless connection, such as a suitable cellular, Bluetooth or WiFi coupling, or over a wired coupling such as may be found at a service station or docking station.

In various embodiments, security policy 60 may comprise various kinds of policies. The security policy may provide data security and/or protect driver safety. Several non-limiting examples of policies, which can be used as policy 60, include:

Policies that verify the authenticity and trustworthiness of data downloaded from outside the vehicle for storage in the vehicle. One example of such data is maps that are downloaded by a guest app to the vehicle during driving. The external data source (e.g., a cloud, application) is considered a non-trusted domain, whereas the vehicle storage is considered a trusted domain. In some embodiments, before transferring the data for storage in the vehicle, security policy 60 instructs gateway 60 to authenticate the stream of data being downloaded by the quest app, e.g., using some cryptographic authentication scheme.

Policies that permit data flow from the secured domain to the unsecured domain, but not in the opposite direction. For example, policy 60 may permit a guest app to present camera streams from ADAS 28 to the driver, but not to control the cameras.

Policies that protect the vehicle systems from Ransomware, e.g., malware that hijacks a certain driving subsystem.

Policies that provide data, segregation between guest apps, i.e., prevent data sharing between guest apps, for reasons of data privacy.

Additionally or alternatively, any other suitable type of security policy can be used.

The configurations of the automotive data-processing systems depicted in FIGS. 1-3, and their components such as gateway 44, are example configurations that are depicted solely for the sake of clarity. In alternative embodiments, any other suitable configurations can be used. For example, the embodiments described herein refer mainly to a single centralized gateway 44. In alternative embodiments, the functions of gateway 44 can be distributed between two or more gateways in any suitable way. For example, each gateway may serve a respective subset of the guest apps. Security policy 60 may be distributed to the various gateways, or stored in a centralized storage device and accessed by the various gateways.

As another example, system 20 may comprise other suitable types of electronic subsystems and/or devices, laid out and connected in any other suitable scheme. As another example, the packet network (including links 36 and switches 40) may have any other suitable topology. As another example, gateway 44 may communicate with subsystems of the vehicle using other suitable interfaces, either instead of or in addition to the Ethernet network. Such interfaces may comprise, for example, Peripheral Component Interconnect express (PCIe), Controller-Area Network (CAN) bus, or any other suitable interface or protocol. In some embodiments gateway 44 may comprise additional components, such as accelerators.

The different elements of system 20 and its components, e.g., gateway 44, may be implemented using dedicated hardware or firmware, such as using hard-wired or programmable logic, e.g., in one or more Application-Specific Integrated Circuits (ASIC) and/or one or more Field-Programmable Gate Arrays (FPGA). Additionally or alternatively, some functions of the components of system 20, e.g., of gateway 44, may be implemented in software and/or using a combination of hardware and software elements. Elements that are not mandatory for understanding of the techniques have been omitted from the figure for the sake of clarity.

In some embodiments, CPU 52 comprises one or more programmable processors, e.g., a cluster of processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 4:
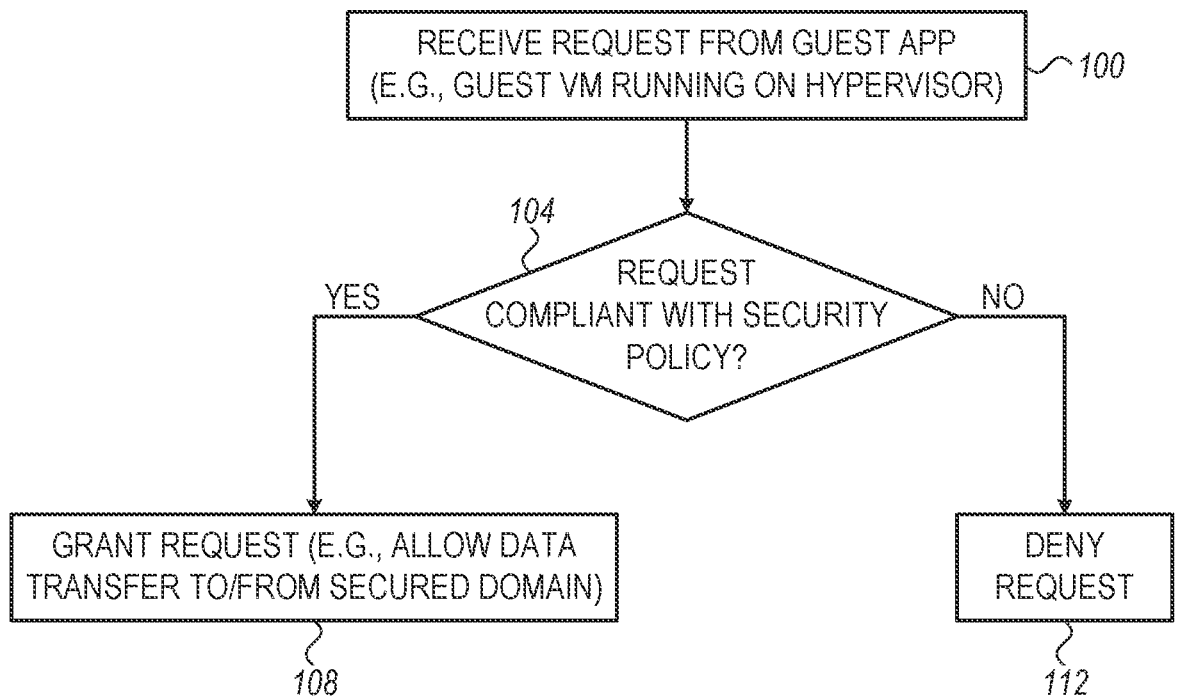
FIG. 4 is a flow chart that schematically illustrates a method of security in the automotive data-processing system of FIG. 1, in accordance with an embodiment that is described herein.

FIG. 4 is a flow chart that schematically illustrates a method of maintaining security in the automotive data-processing system of FIG. 1, in accordance with an embodiment that is described herein. The method begins with hypervisor 91 of gateway 44 receiving a request from a guest application (e.g., a guest app running in a VM), at a request reception operation 100. In some embodiments the guest app requests to receive data from a certain subsystem of the vehicle, e.g., from a sensor. In another embodiment, the guest app requests to control a certain subsystem of the vehicle.

At a policy checking operation, hypervisor 91 checks whether the request is compliant with security policy 60. If compliant, hypervisor 91 grants the request, at a permission operation 108. In this case, communication transfer between the guest app and the vehicle subsystem is allowed to proceed. If not compliant, hypervisor 91 denies the request, at a denial operation 112, and communication transfer between the guest app and the vehicle subsystem is blocked.

In some cases, at least some of the communication traffic between guest, apps and vehicle subsystems is encrypted. Thus, in some embodiments, gateway 44 is configured to decrypt the communication traffic in order to monitor it. Additionally or alternatively, gateway may authenticate the communication traffic, e.g., requests, or the sources of the communication traffic, before granting access to vehicle subsystems.

It is noted that the embodiments described above are cited by way of example, and that the present invention is not limited to what has been particularly shown, and described hereinabove. Rather, the scope of the present invention includes both, combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An automotive gateway, comprising:
one or more interfaces for communicating with electronic subsystems of a vehicle; and
one or more processors, configured to host one or more guest applications and to control communication traffic between the one or more guest applications and the electronic subsystems of the vehicle in accordance with a security policy, by exposing to the guest applications an Application Programming Interface (API) that complies with the security policy.

2. The automotive gateway according to claim 1, wherein, in accordance with the security policy, the one or more processors are configured to selectively grant or deny transfer of data from an electronic subsystem of the vehicle to a guest application.

3. The automotive gateway according to claim 1, wherein, in accordance with the security policy, the one or more processors are configured to selectively grant or deny a request from a guest application to control an electronic subsystem of the vehicle.

4. The automotive gateway according to claim 3, wherein the one or more processors are configured to deny the request when the request, or the electronic subsystem, has an impact on vehicle safety.

5. The automotive gateway according to claim 1, wherein the guest applications comprise Virtual Machines (VMs), and wherein the one or more processors are configured to run a hypervisor that controls the communication traffic of the VMs in accordance with the security policy.

6. The automotive gateway according to claim 1, wherein, in accordance with the security policy, the one or more processors are configured to authenticate data downloaded from outside the vehicle.

7. The automotive gateway according to claim 1, wherein, in accordance with the security policy, the one or more processors are configured to permit data flow from an electronic subsystem of the vehicle to a guest application, and to prevent data flow from the guest application to the electronic subsystem.

8. The automotive gateway according to claim 1, wherein, in accordance with the security policy, the one or more processors are configured to protect the electronic subsystems from ransomware.

9. The automotive gateway according to claim 1, wherein, in exposing the API, the one or more processors are configured to control communication traffic with one or more third-party guest applications that are installed by a user of the vehicle, while complying with the security policy.

10. An automotive gateway, comprising:
one or more interfaces for communicating with electronic subsystems of a vehicle; and
one or more processors, configured to:
host one or more guest applications; and
in accordance with a security policy, (i) control communication traffic between the one or more guest applications and the electronic subsystems of the vehicle, and (ii) prevent data sharing between at least first and second guest applications among the guest applications.

11. A method for data processing in a vehicle, the method comprising:
hosting one or more guest applications in an automotive gateway installed in a vehicle; and
controlling, by the automotive gateway, communication traffic between the one or more guest applications and electronic subsystems of the vehicle in accordance with a security policy, by exposing to the guest applications an Application Programming Interface (API) that complies with the security policy.

12. The method according to claim 11, wherein controlling the communication traffic comprises selectively granting or denying transfer of data from an electronic subsystem of the vehicle to a guest application.

13. The method according to claim 11, wherein controlling the communication traffic comprises selectively granting or denying a request from a guest application to control an electronic subsystem of the vehicle.

14. The method according to claim 13, wherein controlling the communication traffic comprises denying the request when the request, or the electronic subsystem, has an impact on vehicle safety.

15. The method according to claim 11, wherein hosting the guest applications comprises running Virtual Machines (VMs) on the automotive gateway, and wherein controlling the communication traffic comprises running a hypervisor that controls the communication traffic of the VMs in accordance with the security policy.

16. The method according to claim 11, wherein controlling the communication traffic comprises authenticating data downloaded from outside the vehicle.

17. The method according to claim 11, wherein controlling the communication traffic comprises permitting data flow from an electronic subsystem of the vehicle to a guest application, and preventing data flow from the guest application to the electronic subsystem.

18. The method according to claim 11, wherein controlling the communication traffic comprises protecting the electronic subsystems from ransomware.

19. The method according to claim 11, wherein controlling the communication traffic comprises preventing data sharing between at least first and second guest applications among the guest applications.

20. The method according to claim 11, wherein exposing the API comprises controlling communication traffic with one or more third-party guest applications that are installed by a user of the vehicle, while complying with the security policy.

\* \* \* \* \*